(12) United States Patent
Kottschlag et al.

(10) Patent No.: US 7,200,375 B2
(45) Date of Patent: Apr. 3, 2007

(54) RADIO RECEIVER SYSTEM

(75) Inventors: Gerhard Kottschlag, Hildesheim (DE); Gerhard Pitz, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 10/480,362

(22) PCT Filed: May 25, 2002

(86) PCT No.: PCT/DE02/01932

§ 371 (c)(1),
(2), (4) Date: Jun. 22, 2004

(87) PCT Pub. No.: WO03/001703

PCT Pub. Date: Jan. 3, 2003

(65) Prior Publication Data

US 2004/0248538 A1    Dec. 9, 2004

(30) Foreign Application Priority Data

Jun. 22, 2001    (DE) ................. 101 30 234

(51) Int. Cl.
*H04B 1/06* (2006.01)
*H04B 1/18* (2006.01)
*H01Q 21/00* (2006.01)

(52) U.S. Cl. ............... 455/272; 455/279.1; 455/292; 343/853

(58) Field of Classification Search ............... 455/132, 455/137, 179.1, 272, 279.1, 292, 190, 193.1, 455/193.3; 343/853; 375/347
See application file for complete search history.

(56) References Cited

U.S. PATENT DOCUMENTS

| 4,208,663 | A | * | 6/1980 | Ogita ............... 343/853 |
| 4,397,036 | A | * | 8/1983 | Hirade et al. ........ 455/137 |
| 4,558,291 | A |   | 12/1985 | Nichols |
| 5,986,617 | A | * | 11/1999 | McLellan ........... 343/860 |
| 6,064,865 | A |   | 5/2000 | Kuo et al. |

FOREIGN PATENT DOCUMENTS

| EP | 0 967 746 | 12/1999 |
| GB | 2 257 605 | 1/1993 |

* cited by examiner

*Primary Examiner*—George Eng
*Assistant Examiner*—Michael Thier
(74) *Attorney, Agent, or Firm*—Kenyon & Kenyon LLP

(57) ABSTRACT

A radio receiver system having a plurality of receiving antennas and a plurality of receivers is described in which antenna signals of a multiplicity of the plurality of receiving antennas are fed to each of the plurality of receivers. The plurality of receiving antennas may be interconnected to the plurality of receivers more flexibly as a function of the desired reception strategy. In addition, the functionality of the entire system may also be maintained in the event of a defect or failure of one or more receiving antennas.

8 Claims, 2 Drawing Sheets

RADIO RECEIVER SYSTEM

FIELD OF THE INVENTION

The present invention relates to a radio receiver system having a plurality of receiving antennas and a plurality of receivers.

BACKGROUND INFORMATION

Radio receiver systems having a plurality of receivers for different radio frequencies, also known as multichannel radio receivers, are fed from one common antenna or a plurality of antennas, each of which is individually assigned to one of the plurality of receivers. If one antenna fails, the connected receivers can no longer be used; conversely, a receiver failure has the result that the connected antenna can also no longer be used.

Conventionally, as a remedy and to make the receiver system more flexible, switching matrices may be placed between the antenna outputs and the receiver inputs making it possible to assign one receiving antenna to each receiver unambiguously, thus to connect each one of the plurality of antennas to one of the receivers.

SUMMARY

A radio receiver system having a plurality of receiving antennas and a plurality of receivers may have the advantage that even if one of the plurality of receiving antennas fails as the result of an interruption of its antenna lead, for example, the antenna signal of at least one receiving antenna is always still available to each of the connected receivers for analysis. To that end, it is provided according to the present invention that antenna signals of a multiplicity of the plurality of receiving antennas are fed to each of the plurality of receivers.

Provided that the available antennas have comparable reception characteristics, all of the conventional operating variants on which the conventional circuit concept is based, each receiver being connected to exactly one antenna, continue to be possible with the radio receiver system according to the present invention. This also applies, for example, to double tuner or multi-tuner operation in which a first tuner or receiver, for example, is tuned to a radio frequency via which an audio signal to be played back is transmitted, while a second tuner or receiver is tuned to a second radio frequency via which, for example, digitally coded radio traffic information according to the traffic message channel (TMC) standard, for example, is transmitted. In addition, however, the present invention also makes it possible, for example, to implement the double tuner or multi-tuner operation in the event that one of, for example, two receiving antennas is defective or not all tuner or receiver inputs are connected to their own antenna. In this case, the signals of the connected antennas are fed to all connected receivers automatically. Thus, for example, double tuner or multi-tuner operation is possible without any switching action using, as described above for example, a first tuner as a foreground receiver and a second tuner as a background receiver, even in the event of failure of one of two receiving antennas.

According to one advantageous embodiment of the present invention, each of the antenna signals fed to one of the plurality of receivers is subjected to an individual weighting. The individual weighting may advantageously include amplification or attenuation and/or a phase shift of the antenna signals.

In cochannel operation, when a plurality of the receivers or all receivers are tuned to the same radio frequency, it is possible to imitate a directional antenna by suitably controlling the phase shifts. Compared to an individual antenna, such a directional antenna shows an antenna gain and moreover a suitable change in the weighting of the antenna signals, the phase shifts in particular, makes it possible to adjust the reception characteristic or reception direction of the virtual directional antenna.

When the present invention is used in mobile radio receiver systems such as car radios, for example, it is possible to adjust the directional characteristic of the virtual directional antenna to the reception conditions, transmitter locations in particular, by suitably controlling the weighting parameters, by an adaptive algorithm for example. In particular, it is possible to track the directional characteristic continuously to receive the signal of a specific transmitter (location).

Instead of changing the weighting parameters, such as the amplification factor (amplification or attenuation) and/or phase shift, it is possible for the directional characteristic of the virtual directional antenna to be performed by signal processing in subsequent stages of the receivers, in particular by suitable algorithms, in one or a plurality of signal processors (DSP). In this connection, it is advantageous that the radio receiver system according to the present invention may be constructed using constant weighting elements and therefore simple components.

Furthermore, antenna diversity operation is also conceivable in cochannel operation. To that end, an individual amplification and phase shift in particular is assigned for each connected receiver and for each antenna signal so that each connected receiver receives a different mixture of antenna signals. A suitable control algorithm is used to select from the connected receiving antennas the one whose antenna signal makes the best radio reception possible. The receiving antenna is selected by suitably controlling the amplification or attenuation values of the assigned weightings.

BRIEF DESCRIPTION OF THE DRAWINGS

Exemplary embodiments of the present invention are shown in the figures and are explained in greater detail below.

DETAILED DESCRIPTION OF EXAMPLE EMBODIMENTS

Figure 1:
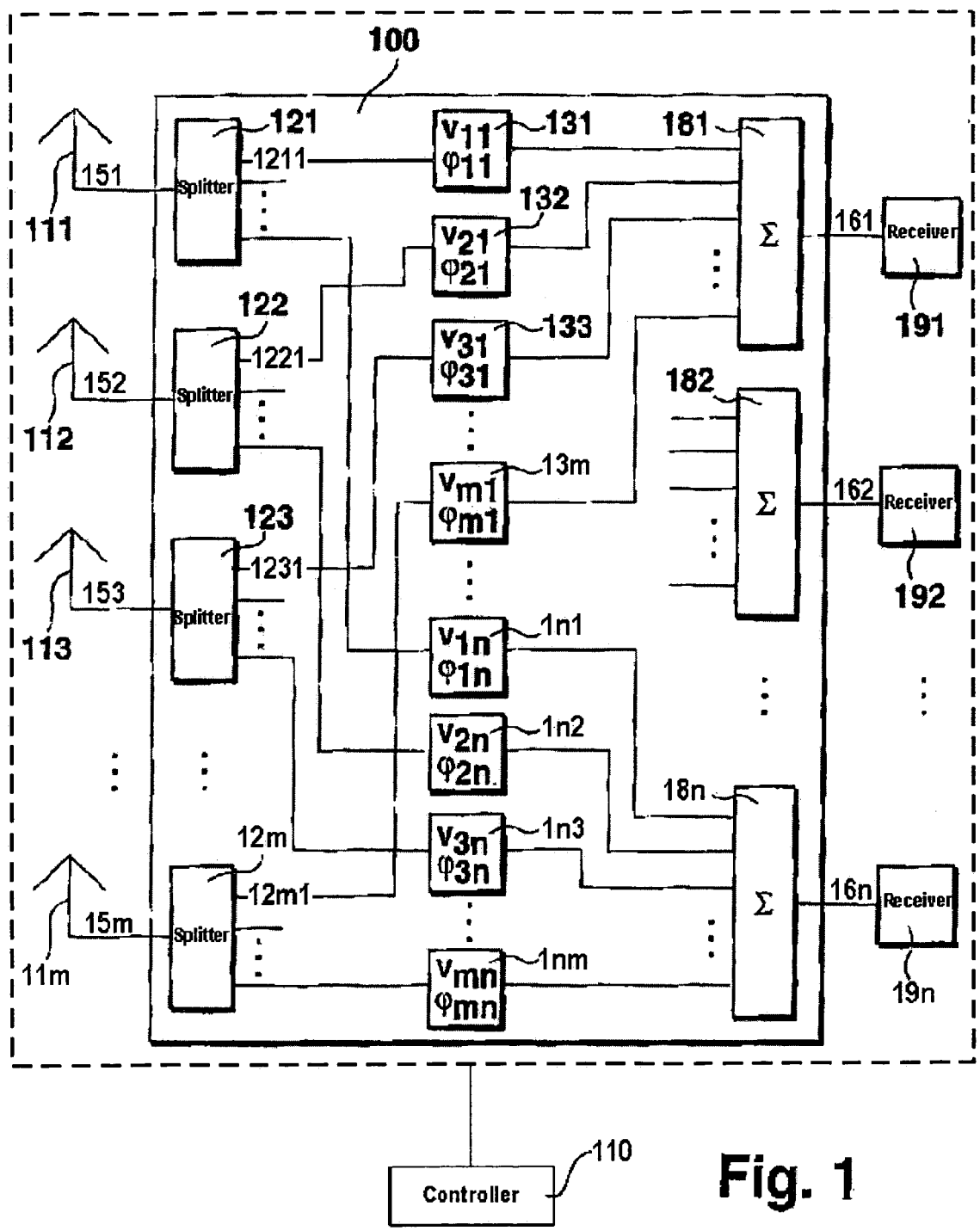
FIG. 1 shows a block diagram of a radio receiver system according to the present invention having a system for connecting a plurality of receiving antennas with a plurality of receivers.

The present invention will be described below taking a mobile radio receiver system as an example, in this case a car radio designed to receive frequency modulated (FM) very high frequency (VHF) signals. This is not to be understood as an intention to limit the invention but instead it is generally applicable to radio receiver systems having a plurality of receiving antennas and a plurality of receivers.

The car radio according to the present invention includes a plurality of receivers $19_1, 19_2, \ldots, 19_n$. Each of receivers 191 through 19n referred to may be tuned to a common radio frequency or to a plurality of radio frequencies that are different from each other using an associated tuning control signal, which is generated by a controller 110. Antenna signals of a plurality of receiving antennas 111, 112, 113 through 11m may be fed to cited receivers 191 through 19n. The radio signals received via receiving antennas 111 through 11m are assigned or distributed to the plurality of receivers 191 through 19n via an assignment system 100.

The received radio signals, each of which is made up of a mixture of radio frequencies receivable at the receiver location, present at receiving antennas 111, 112, 113 through 11m are fed to inputs 151, 152, 153 through 15m of assignment system 100. The radio signal of first receiving antenna 111 which is present at first input 151 of assignment system 100 is fed to a first antenna signal splitter 121, referred to hereinafter simply as splitter, in which the antenna signal is uniformly divided among the number of receivers connected, n in this case. Likewise, the second antenna signal of second receiving antenna 112 is distributed to n receivers 191 through 19n using a second splitter 122, the third antenna signal supplied by third receiving antenna 113 is distributed using a third splitter 123 and the antenna signal supplied by the mth receiving antenna 11m is distributed using an mth splitter 12m. A first output signal 1211 of first splitter 121, which represents a first component of the signal supplied by first receiving antenna 111, is fed to a first summing circuit 181 via a first weighting circuit 131; the summing signal present at the output of the first summing circuit is fed to first receiver 191 via first output 161 of assignment system 100. In addition, a first component 1221 of the antenna signal of second receiving antenna 112 present at a first output of second splitter 122 is fed to a second input of first summing element 181 via a second weighting circuit 132. In addition, a first component 1231 of the antenna signal supplied by third receiving antenna 113 to third splitter 123 is fed to first summing element 181 via a third weighting circuit 133. Finally a first component 12m1, which is obtainable from the mth splitter 12m and which is formed by splitting the antenna signal of mth receiving antenna 12m, is fed to first summing circuit 181 via an mth weighting circuit 13m. The first antenna summing signal, which is present at the output of first summing circuit 181 and thus at first output 161 of assignment system 100, is thus produced as the sum of the components of the antenna signals of receiving antennas 111, 112, 113 through 11m, which were weighted using weighting circuits 131, 132, 133 through 13m.

Likewise, the second antenna summing signal, which is present at the output of second summing circuit 182 and accordingly at second output 162 of assignment system 100, is produced from the evaluated or weighted sum of the second components of the antenna signals of first receiving antenna 111, second receiving antenna 112, third receiving antenna 113 and mth receiving antenna 11m. The second antenna summing signal is fed to second receiver 192.

Finally, an nth component of the antenna signal of first receiving antenna 111, which is divided off from the first antenna signal using first splitter 121, is fed to an nth summing circuit 18n via a first weighting circuit 1n1 of an nth weighting circuit group; the nth component of the antenna signal of second receiving antenna 112 is fed to nth summing circuit 18n via a second weighting circuit 1n2 of the nth weighting circuit group; an nth component of the antenna signal of third receiving antenna 113 is fed to nth summing circuit 18n via a third weighting circuit 1n3 of the nth weighting circuit group and finally the nth component of the antenna signal of mth receiving antenna 11m is fed to nth summing circuit 18n via an mth weighting circuit 1nm of the nth weighting circuit group. The sum of the last components of the antenna signals of first receiving antenna 111, 112, 113 through 11m, which are evaluated according to weighting circuits 1n1, 1n2, 1n3 through 1nm, is obtainable at an nth output 16n of assignment system 100 and is fed to an nth receiver 19n.

In weighting circuits 131, 132, 133 through 13m and 1n1, 1n2, 1n3 through 1nm, the supplied antenna signals, which were derived from the supplied antenna signals by splitters 121, 122, 123 through 12m, are each provided with an individual phase shift $\phi_{11}, \phi_{21}, \phi_{31}$ through $\phi_{m1}, \ldots \phi_{1n}, \phi_{2n}, \phi_{3n}$, through $\phi_{mn}$. Additionally or alternatively, the antenna signals fed to the weighting circuits may each be weighted with an individual amplification factor $v_{11}, v_{21}, v_{31}, \ldots, v_{m1}, \ldots, v_{1n}, v_{2n}, v_{3n}, \ldots, v_{mn}$, i.e., individually amplified or attenuated.

Thus the antenna summing signals fed to receivers 191, 192 through 19n are produced as a superposition of individually amplified or attenuated and/or phase-shifted antenna signals of receiving antennas 111, 112, 113 through 11m.

A preferred embodiment of the present invention provides that both the amplification factors of the individual weighting circuits as well as their phase shifts are specified by respective control signals generated by controller 110.

Using the system described, in cochannel operation, for example, if all or at least a subset of a plurality of connected receivers 191 through 19n is tuned to the same reception frequency, a directional antenna may be simulated, for example, for the selective reception of a radio frequency transmitted by a specific transmitter. In contrast to an omnidirectional receiving antenna with constant sensitivity all around, such a directional antenna represents an antenna gain, which makes it possible to increase the reception quality of a desired reception frequency. In particular, it is also possible, in the case of a mobile receiver in particular, to use a suitable adaptive algorithm, for example, to track the amplification factors and phase shifts of the weighting circuits in such a way that the directional characteristic of virtual directional antenna 111 through 11m is constantly tracked to the transmitter location from which the desired radio frequency is transmitted. This also makes it possible to improve reception quality compared to previous systems.

In addition, by suitably designing the control software of controller 110, an automatic operating mode detection, as described below, may also be implemented. If at least two receiving antennas 111 through 11m are connected, it is possible to select a cochannel reception strategy as described above, for example, or operation of the receivers on different frequencies, known as foreground/background operation. Both reception modes are used alternately depending on the requirements. However, if only one antenna is connected, due to an interruption of an antenna feed, for example, cochannel operation is not possible because both receivers then receive the same antenna signal. In this case, advantageously foreground/background operation is permanently utilized. The detection of whether two or more antennas are available for reception takes place automatically in the following manner, for example.

A plurality of transmitters on different frequencies, which are as widely separated as possible, are selected in succession and the level is measured in the at least two receivers 191, 192. If the level difference between the receivers is approximately equal at all frequencies and/or it hardly changes even with a plurality of measurements in specific intervals and/or in a moving vehicle (a signal indicating the movement of the vehicle may be derived, for example, from the speedometer signal), it must be assumed that only one antenna is connected. In all other cases, at least two antennas are present because the level differences arise through addition in different phase positions, i.e., there is a different phase relationship for each reception frequency. They result in different extinctions and signal enhancements. In such cases, cochannel operation for the simulation of a directional antenna function is practical. As an alternative, it is possible to detect the number of connected antennas via the current consumption of a phantom feed of the receiving antennas, provided active antennas are used.

Figure 2:
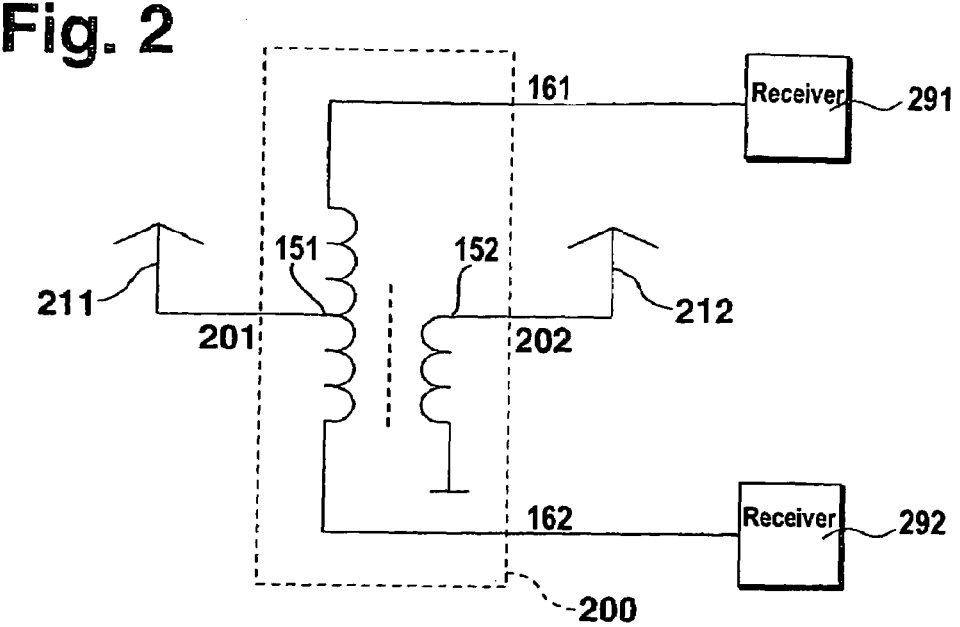
FIG. 2 shows a specific exemplary embodiment of the present invention for the case of two receiving antennas and two receive sections to be connected to them.

For a system having two receiving antennas 211, 212 and two receivers 291, 292 connected to it, the system according to FIG. 2 is suitable. In this case, assignment system 200 includes a transformer 201 having a center tap on a winding. When an antenna signal is fed, in this case the antenna signal of first receiving antenna 211 via first antenna input 151 on the center tap, this signal is distributed in phase to two outputs 161 and 162 and receivers 291 and 292 connected to them. The antenna signal of second receiving antenna 212 present at second winding 152 of transformer 201 is delivered in phase opposition to the two outputs 161 and 162 of assignment system 200 and thus fed to the two connected receivers 291 and 292.

Moreover, this assignment system offers the advantage that if the turn ratio is properly selected, the antenna impedances are stepped up into the receiver input circuits of receivers 291 and 292, making it possible to design the input circuits of the receivers with higher quality.

Figure 3:
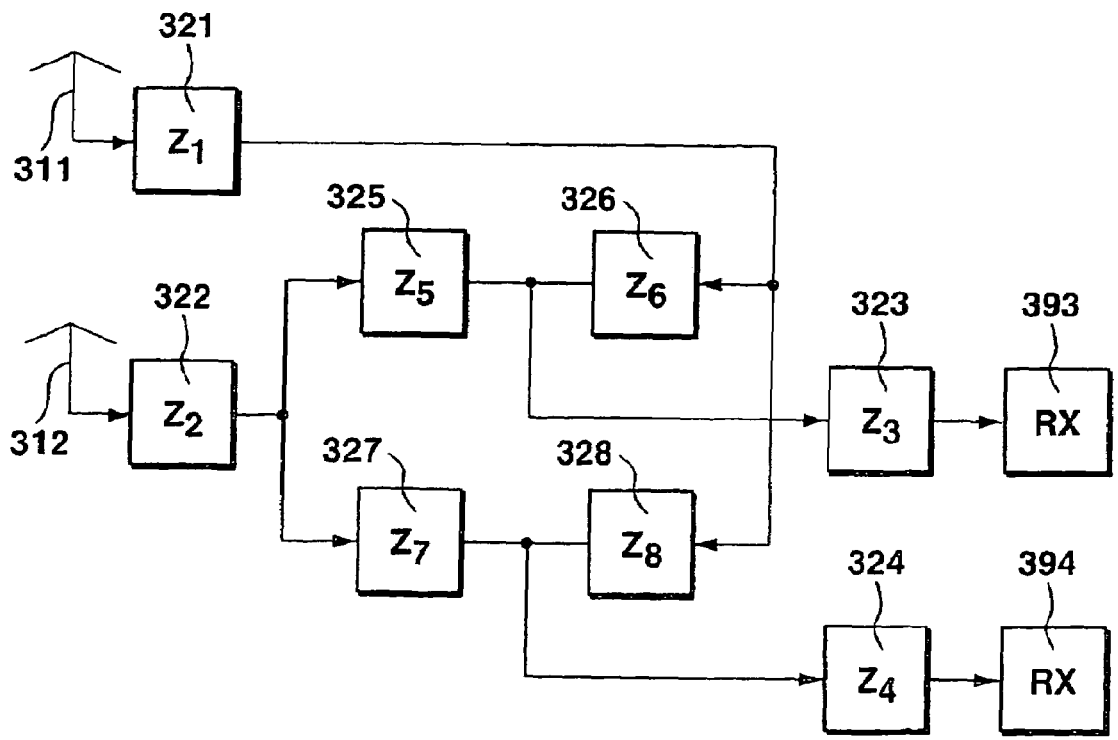
FIG. 3 shows another exemplary embodiment for connecting two receiving antennas to two receivers.

FIG. 3 shows an assignment system 300 without a transformer. Impedances $Z_5$, $Z_6$, $Z_7$, $Z_8$, which are provided with reference numerals 325, 326, 327 and 328 in the figure, perform the signal distribution with different phase relationships, in which the distribution of the signal of a second receiving antenna 312 coming from a second impedance $Z_2$ (reference numeral 322) through fifth impedance 325 and seventh impedance 327 must result in a different phase relationship than the distribution of the signal of first receiving antenna 311 coming from first impedance 321 by sixth impedance 326 and eighth impedance 328. In the simplest case, each of these elements (325, 326, 327, 328) is made up of a capacitor or a coil. The necessary phase relationship results if, for the four impedances 325, 326, 327, and 328, three coils are combined with one capacitor or even one coil is combined with three capacitors. The remaining impedances 321, 322, 323 and 324 are used for impedance adjustment. The antenna signal supplied by first receiving antenna 311 is fed to first impedance 321 via a first input of an assignment system; likewise, the second antenna signal of second receiving antenna 312 is supplied via a second input of the assignment system to second impedance 322. The antenna signal that may be picked off at the output of third impedance 323, which is present at a first output of the assignment system is fed to a first receiver 393; likewise, the output signal of fourth impedance 324, which is present at a second output of the assignment system, is fed to a second receiver 394 for further processing.

What is claimed is:

1. A radio receiver system, comprising:
   at least two receiving antennas;
   at least two receivers;
   an assignment system to feed antenna signals from the at least two receiving antennas to each of the receivers, the assignment system including a transformer having a first winding and a second winding, a first one of the receiving antennas being connected to a center tap of the first winding, end terminals of the first winding being connected to the receivers and a second one of the receiving antennas being connected to an end terminal of the second winding.

2. The radio receiver system as recited in claim 1, further comprising:
   a controller configured to analyze the antenna signals, the controller configured to select, in succession, a plurality of transmitters on different frequencies lying as far apart from each other as possible, measure a reception level of the signals received via the frequencies in the at least two receivers, and determine, based on the measuring results, if only one of the at least two antennas is connected to the assignment system, the connection of only one antenna being inferred when a level difference between the reception signals is at least one of: i) approximately equal at all selected frequencies, ii) the level does not change substantially even with a plurality of measurements at specific intervals in a moving vehicle.

3. The radio receiver system as recited in claim 2, wherein the controller is configured to recognize the connection of the at least two receiving antennas in all other cases.

4. The radio receiver system as recited in claim 2 wherein each of the antenna signals fed to one of the receivers is subjected to an individual weighting.

5. The radio receiver system as recited in claim 4, wherein the weighting includes an amplification or attenuation.

6. The radio receiver system as recited in claim 4, wherein the weighting includes a phase shift.

7. The radio receiver system as recited in claim 4, wherein the weighting of the antenna signals of at least some of the receiving antennas fed to one of the receivers is configured so that an antenna directional characteristic is produced for the receiver.

8. The radio receiver system as recited in claim 7, wherein the weighting of the antenna signals of the at least some of the receiving antennas fed to the one of the receivers is controlled as a function of a desired antenna directional characteristic.

* * * * *